June 5, 1923.
J. A. PLANTE
CUTTING OVERSHOT
Filed Aug. 25, 1922
1,458,118
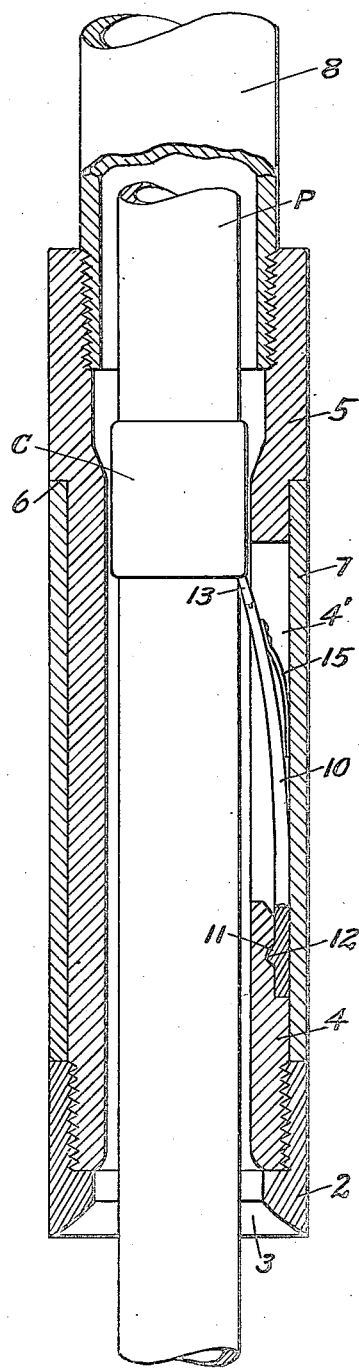
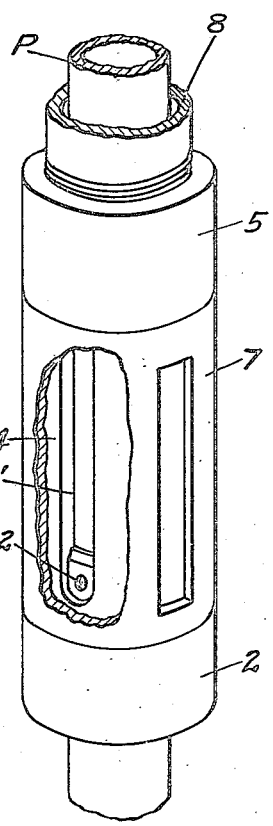
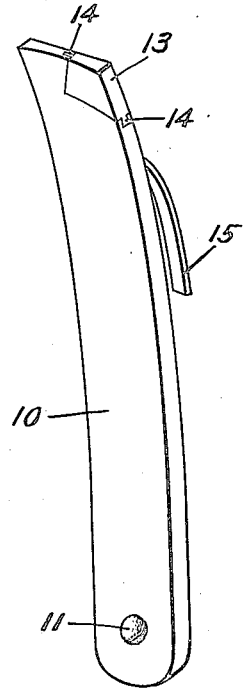
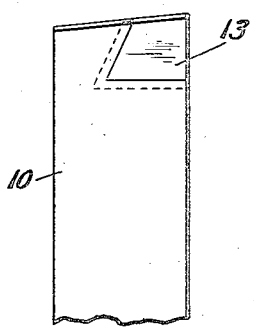
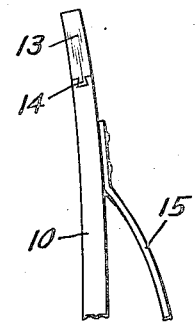
INVENTOR
JOSEPH A. PLANTE
BY Hazard & Miller
ATT'YS.

Patented June 5, 1923.

1,458,118

UNITED STATES PATENT OFFICE.

JOSEPH A. PLANTE, OF SAN PEDRO, CALIFORNIA.

CUTTING OVERSHOT.

Application filed August 25, 1922. Serial No. 584,265.

*To all whom it may concern:*

Be it known that I, JOSEPH A. PLANTE, a citizen of the United States, residing at San Pedro, in the county of Los Angeles and State of California, have invented new and useful Improvements in Cutting Overshots, of which the following is a specification.

This invention relates to improvements in fishing tools for deep well work, and more particularly to overshots.

It is an object of the present invention to provide a pipe or tube cutting overshot or fishing tool.

In my Patent No. 1,345,103, dated June 29, 1920, there is disclosed an overshot fishing tool, and the present invention is an improvement in that type of tool.

It is an object of the invention to provide a simple, practicable, substantial and effective fishing and pipe cutting overshot tool.

Other objects and advantages will be made manifest in the following specification of an embodiment of the invention illustrated in the accompanying drawings, wherein—

Figure 1 is a perspective of a fragment of the tool showing it in effective position surrounding a string of pipe to be cut and removed;

Figure 2 is a longitudinal central section of the improved tool showing it in working position;

Figure 3 is a perspective of one of the hook and cutting members;

Figure 4 is a front elevation of the cutting end of one of the hook members;

Figure 5 is an edge view of one of the hook and cutting members.

This type of tool consists of a lowermost section which may be termed a bell or shoe 2, preferably having an inwardly convergent mouth 3 to readily slip down over a string of pipe sections P, which sections may be connected together as by any suitable formation of coupling C. The bell 2 is threaded on the lower end of a sleeve or barrel 4 of suitable form and length and which is provided with a head portion 5 having a transverse shoulder 6 upwardly against which rotatively seats a sleeve or outer shell 7, the lower end of which bears against the contiguous edge of the bell 2, the outer surfaces of the bell, the shell 7 and the head 5 being of substantially equal diameters and forming a cylinder. To the head 5 there is connected an operating tubular stem 8, whereby the tool may be lowered into the well hole so that the bell 2 will pass over the uppermost end or pipe section P and the tool may then be lowered as far as practicable into the well.

To facilitate pulling the engaged string of pipe sections P a number of resilient hook members or spring bars 10 of suitable length are arranged longitudinally in pockets 4' of the barrel 4; the lower ends of these pockets are shown in Figure 1 as being semicircular to conform to a corresponding lower end of each of the spring bars 10. These bars are provided with buttons or protuberances 11 to engage in complementary recesses 12 formed therefor in the seats provided in the lower portion of the barrel 4. These spring arms 10 have a normal lateral curvature so that when they are arranged in the longitudinal slots 4' and are held to the seats in the barrel 4, the upper ends of the spring arms 10 project inwardly and, therefore, as the tool is lowered along a string of pipe sections the spring arms will snap in under the lower shoulders of the couplings C.

When it has been found that the string of pipe cannot be pulled from the well and recovered, it is very desirable to cut the pipe at the lowermost or any other suitable point and recover the upper portion. To that end, a feature of the invention consists in providing the spring bars with cutting means and as here shown the upper end of each spring bar is provided or formed for cutting purposes as by applying tool steel cutters 13. These cutters may consist of suitably shaped blocks which may be rigidly and firmly mounted upon the ends of the bars 10. As here shown the cutting blocks 13 are mortised at 14 into the edges of the cut away forward corner of the bars. By this means, after the tool has been lowered into the well hole and has gripped an instrument in the hole to be pulled, if the pulling is not accomplished, it is then only necessary to rotate the driving stem or tube 8 and thus, while the cutters 13 are drawn tight up against a coupling C, the rotation of the tool causes the cutters to cut away the coupling until it is severed from the lowermost fast section of the pipe. Thereafter the tool with the grappled section of pipe can be pulled from the well.

It is desirable in some cases to provide supplementary means for springing the bars 10 inwardly and for such purpose I attach to the outer surface of each of the bars 10 a supplemental leaf spring 15 which is designed to spring outwardly and bear against the inner surface of the shell or sleeve 7 which serves as a means for holding the spring bars 10 in their seats in the lower portion of the barrel 4.

Further embodiments, modifications and variations may be resorted to within the spirit of the invention as claimed.

What is claimed is:

1. A deep well overshot fishing tool provided with resilient locking bars for engaging a part of an instrument in a well that is to be recovered, said bars being provided with inserted cutters whereby when the tool is rotated the engaged instrument may be severed.

2. An overshot fishing tool having, in combination, spring hooking bars having pipe engaging ends provided with cutting means.

3. An overshot fishing tool having, in combination, a set of inwardly springing pipe engaging resilient hooking bars, an encasing sleeve, and supplementary springs interposed between said bars and said sleeve for pressing said bars inwardly.

In testimony whereof I have signed my name to this specification.

JOSEPH A. PLANTE.